UNITED STATES PATENT OFFICE.

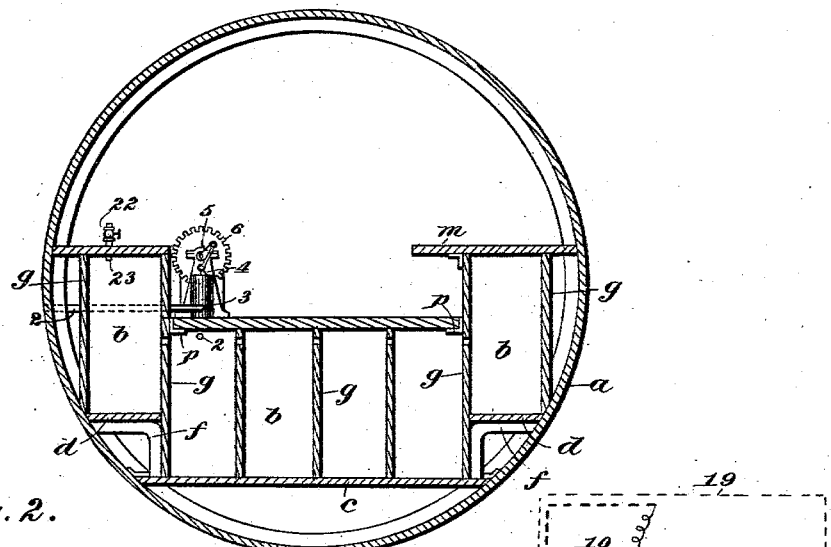
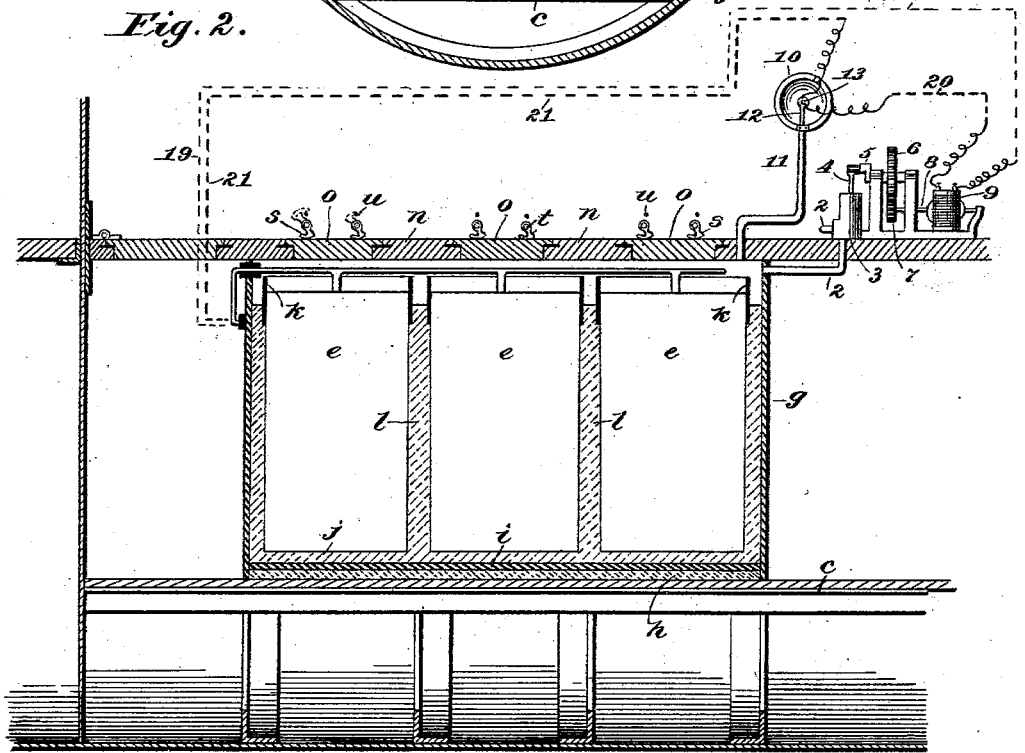

SIMON LAKE, OF BRIDGEPORT, CONNECTICUT.

BATTERY INSTALLATION.

SPECIFICATION forming part of Letters Patent No. 716,844, dated December 23, 1902.

Original application filed March 4, 1902, Serial No. 96,633. Divided and this application filed June 23, 1902. Serial No. 112,823. (No model.)

*To all whom it may concern:*

Be it known that I, SIMON LAKE, a citizen of the United States, residing at Bridgeport, in the county of Fairfield and State of Connecticut, have invented certain new and useful Improvements in Battery Installations, of which the following is a specification.

This application is a division of my pending application, Serial No. 96,633, filed March 4, 1902.

The present invention has for its object to prevent the escape from the storage-battery compartment of a submarine boat into the living quarters of the fumes or gases commonly set free from the battery fluid in the charging of the batteries and also to maintain the atmospheric pressure in such compartment substantially uniform and at a predetermined tension in order to prevent the rising of such pressure above a dangerous limit.

The present improvement consists of certain features of the apparatus herein shown and described for automatically accomplishing this object.

Figure 3:
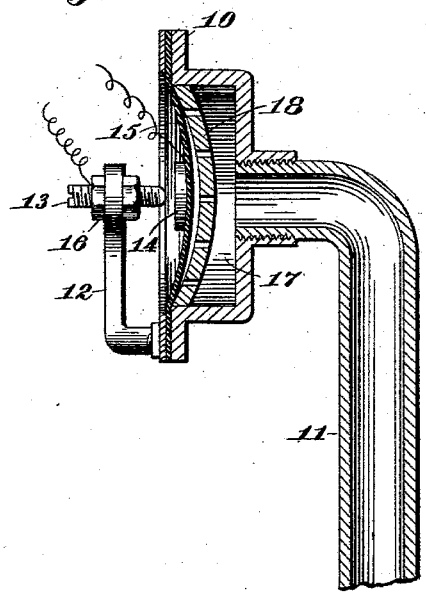
Figure 4:
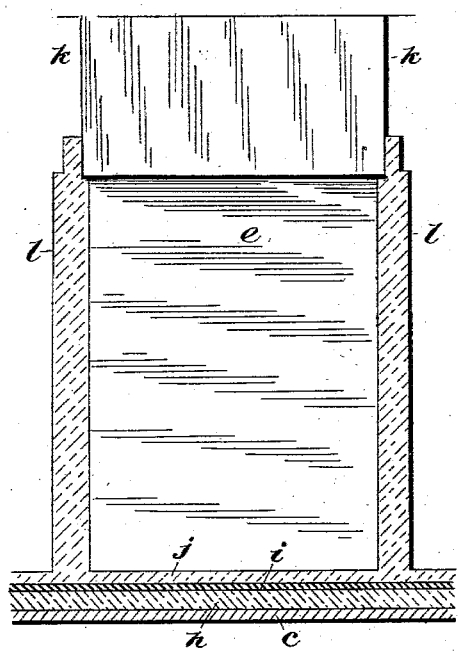
Figure 5:
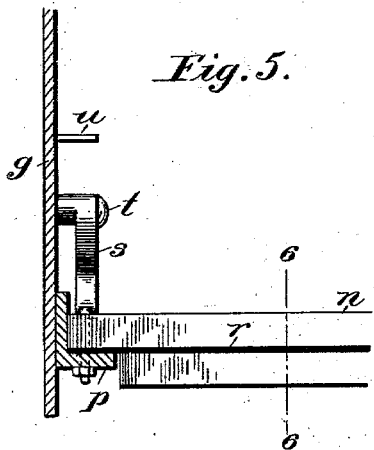
Figure 6:

In the annexed drawings, Figure 1 is a transverse sectional elevation of a submarine boat provided with my present improvement, and Fig. 2 is a longitudinal vertical section of the same. Fig. 3 is a sectional elevation of the circuit-closing device for controlling a pump-actuating motor. Fig. 4 is a partial sectional view of one of the battery-cells with the surrounding insulation. Figs. 5 and 6 are sectional views illustrating the details of construction of the battery compartment or chamber.

The metallic hull $a$ is shown of circular cross-section with its lower midship portion partitioned off into a battery chamber or compartment $b$, having the substantially flat bottom $c$, with elevated offset portions extending along the opposite sides longitudinally of the boat to form battery-shelves $d$, which latter may be of creosoted wooden planks, providing suitable insulation between the battery-cells $e$, resting thereon, and the metallic supporting-brackets $f$. The bottom of said compartment is indicated as of sheet metal and the side walls and partitions $g$ of creosoted wood. The metallic floor of the compartment is shown covered with a thin layer of cement $h$ impervious to moisture, as asphaltum, to which is added a layer $i$ of some flexible waterproof insulating material, as sheets of linoleum, a second layer $j$ of waterproof cement being superposed to complete the composite waterproof insulating-lining, upon which is placed the series of battery-cells $e$, suitably spaced and having their elements electrically connected together in the usual manner. A band $k$ of waterproof insulating material, as sheet-rubber, is shown wrapped around the upper portion of each of the battery-cells, with its upper edge projecting above the latter, and the intervening spaces between the cells and the side walls of the compartment are filled with waterproof cement $l$, which serves not only to insulate the cells each from the others and to exclude moisture intermediate the same, but to maintain them in fixed relation under any motion of the boat, so as to prevent their possible disarrangement. The top of the battery-chamber is raised somewhat along the sides above the battery-shelves to afford seats or bunks $m$ for the crew. The side walls of the compartment are or may be constructed by any well-known method, whereby the joints are sealed air and gas tight; but as represented herein the flooring, constituting the cover of the battery-compartment, is constructed of two alternating series of fixed and removable floor-planks $n$ and $o$, respectively, whose ends are secured upon the angle-pieces $p$, extending longitudinally of the hull. The fixed planks $n$ are each rabbeted along the longitudinal upper edges and provided at the inner angles of the rabbets with saw-kerfs $q$, into which are laid hollow rectangular sheets $r$, of rubber or other suitable yielding packing, overlying the lateral surfaces of the rabbets and the under sides of the notched end portions which rest upon and are bolted to the lateral flanges of the angle-pieces $p$. The removable planks $o$ are similarly rabbeted along the lower edges and ends and are fitted to the rabbeted edges of the planks $n$ and angle-pieces $p$, upon which latter are placed intermediate the ends of the planks $n$ yielding packings, upon which and the packings $r$ the planks $o$ are removably clamped by means of the cam-dogs s, pivoted at t. By loosening the cam-dogs and throwing them over the stop-pins u, as indicated in dotted lines in Fig. 2, the planks o are unlocked and may be withdrawn for inspection of the batteries disposed thereunder.

The battery-compartment is shown connected with the exterior of the boat by means of a vent or discharge pipe 2, connected with an air-pump 3, whose piston-rod 4 is attached to the crank 5, carried by the shaft of a gear-wheel 6, meshing with a pinion 7, mounted upon the shaft 8 of an electric motor 9. This motor is controlled by means of the diaphragm pressure-regulator 10, connected, by means of the pipe 11, with the battery-compartment and preferably independently of the vent or discharge pipe 2. This pressure-regulator is provided with a bracket-arm 12, carrying a screw-stud 13, constituting the stationary member of a circuit-closer of which the movable member is formed by a contact-piece 14, secured to the thin sensitive rubber diaphragm 15, and thus adapted to move to and from the contact-stud 13 as the atmospheric pressure varies in the battery-compartment. The operative end of the contact-stud 13 may be adjusted for contact with the contact-piece 14, corresponding with any given pressure or partial vacuum in the battery-compartment, by merely turning such stud in the proper direction and setting it in its adjustment by means of lock-nuts 16. The regulator-chamber 17 is provided with a perforated shield or partition 18 to prevent the injury of the diaphragm under an excessive vacuum in the battery-compartment. The electric motor 9 has one of its terminals connected directly with its source of electric current (as the battery system shown herein) by means of the conducting-wire 19, while its other terminal is similarly connected by the conducting-wire 20 to one of the members of the circuit-closer 13 14, of which the other member is connected by the wire 21 with the opposite pole of the battery system or other source of current.

It is obvious that the motor 9 will be actuated to operate the air-pump 3 only when the atmospheric pressure in the battery compartment is such as to cause the circuit-closer to close the motor-circuit for supplying electric power to the motor, the latter remaining at other times inactive, such regulated intermittent operation of the pump causing the pressure in the battery-compartment to remain normal under any given adjustment of the contact-stud 13 corresponding to the desired pressure.

Although the several parts of the present improvement are herein shown and described specifically, it is evident that they may be widely varied in construction and arrangement without departure from the spirit of the invention.

As all means of admission of atmospheric air to produce a circulation within the battery-compartment is wholly cut off while the apparatus herein shown and described is set for operation, it is to be understood that by the term "sealed battery-compartment" as employed in the claims annexed is meant a compartment to which air is excluded while the pumping apparatus is in operation.

Having thus set forth the invention, I claim—

1. The combination with the hull of a submarine boat having a sealed battery-compartment, of a system of storage batteries contained in said compartment, and means for automatically discharging gases generated in said batteries outside of the boat and maintaining a predetermined atmospheric pressure within said compartment without the introduction therein of external air.

2. The combination with the hull of a submarine boat having a sealed battery-compartment closed from communication with adjacent portions of the boat whereby the inflow of external air into and the escape of contained fumes or gases from the latter are prevented, of a system of storage batteries contained in said compartment, a vent or discharge pipe connecting the same with the exterior of the boat, a positively-acting pump connected with said vent or discharge pipe, and means for actuating said pump for reducing the atmospheric pressure in said compartment by drawing off a portion of its gaseous contents.

3. The combination with the hull of a submarine boat having a sealed battery-compartment, of a system of storage batteries contained in said compartment, a vent or discharge pipe connecting the same with the exterior of the boat, a pump connected with said vent or discharge pipe, an electric motor for operating said pump, a pressure-regulator connected with said compartment, and a circuit-closer of which one contact member is carried by the pressure-controlled movable member of said pressure-regulator, and connections from said circuit-closer to said electric motor.

4. In a submarine boat, the combination with a closed battery-compartment, of a vent or discharge pipe leading therefrom to the exterior of the boat, a pump connected with said vent or discharge pipe, an electric motor for driving said pump, a diaphragm pressure-regulator connected with the interior of said battery-compartment and carrying one of the contact members of a circuit-closer upon the outer side of its diaphragm, a contact-stud constituting the stationary member of the circuit-closer arranged in the path of movement of said movable member of the circuit-closer, and suitable connections between the motor, its source of current-supply and the contacting members of the circuit-closer.

5. In a submarine boat, the combination with a closed battery-compartment, of a vent or discharge pipe leading therefrom to the exterior of the boat, a pump connected with said vent or discharge pipe, an electric motor for driving said pump, a diaphragm pressure-regulator connected with the interior of said battery-compartment and carrying one of the contact members of a circuit-closer upon the outer side of its diaphragm, an adjustable contact-stud constituting the stationary member of the circuit-closer arranged in the path of movement of said movable member of the circuit-closer, and suitable connections between the motor, its source of current-supply and the contacting members of the circuit-closer.

In testimony whereof I have signed my name to this specification, in the presence of two subscribing witnesses, this 19th day of June, 1902.

SIMON LAKE.

Witnesses:
L. B. MILLER,
H. J. MILLER.